United States Patent
Liu (10) Patent No.: US 8,094,710 B1
(45) Date of Patent: Jan. 10, 2012

(54) WIDE BAND NOISE EARLY DETECTION AND PROTECTION ARCHITECTURE FOR A FREQUENCY DOMAIN EQUALIZER

(75) Inventor: Peter Tze-Hwa Liu, Alameda, CA (US)

(73) Assignee: Marvell International Ltd., Hamilton (BM)

( * ) Notice: Subject to any disclaimer, the term of this patent is extended or adjusted under 35 U.S.C. 154(b) by 736 days.

(21) Appl. No.: 12/062,291

(22) Filed: Apr. 3, 2008

Related U.S. Application Data (60) Provisional application No. 60/910,108, filed on Apr. 4, 2007.

(51) Int. Cl.
H03H 7/30 (2006.01)
H03H 7/40 (2006.01)
H03K 5/159 (2006.01)

(52) U.S. Cl. .......................... 375/233; 375/350; 375/285

(58) Field of Classification Search .......... 375/229–233, 375/285, 346, 350
See application file for complete search history.

(56) References Cited

U.S. PATENT DOCUMENTS

| | | | |
|---|---|---|---|
| 4,707,839 A | 11/1987 | Andren et al. | |
| 6,608,864 B1 * | 8/2003 | Strait | 375/233 |
| 6,973,296 B2 * | 12/2005 | Webster et al. | 455/296 |
| 7,551,514 B2 * | 6/2009 | Kim et al. | 365/236 |
| 7,711,059 B2 * | 5/2010 | Yeh et al. | 375/260 |
| 7,760,826 B2 * | 7/2010 | Chang | 375/346 |
| 2002/0114378 A1 | 8/2002 | Yue | |
| 2005/0286566 A1 | 12/2005 | Tong et al. | |
| 2006/0193390 A1 | 8/2006 | Sedarat | |
| 2007/0183526 A1 | 8/2007 | Norrell et al. | |
| 2007/0201574 A1 * | 8/2007 | Wu et al. | 375/261 |
| 2007/0217526 A1 * | 9/2007 | Park et al. | 375/260 |
| 2009/0073869 A1 * | 3/2009 | Chadha et al. | 370/208 |

OTHER PUBLICATIONS

"Final Draft of ITU-T Recommendation G.993.2," ITU, Feb. 2006.
Armstrong, et al. "Frequency Domain Equalization for PCC-OFDM with overlapping symbol periods" (2000).

* cited by examiner

*Primary Examiner* — Jean B Corrielus (57) ABSTRACT

Apparatus and methods are described for detecting an impulse noise and for controlling frequency domain equalizer (FEQ) coefficient updating in response to impulse noise detection. Upon detection of the impulse noise, FEQ coefficient updating may immediately be frozen to prevent the FEQ coefficients from being corrupted by the impulse noise. The FEQ coefficient updating may be resumed after the impulse has ended, allowing for normal operation and channel detection.

22 Claims, 8 Drawing Sheets

WIDE BAND NOISE EARLY DETECTION AND PROTECTION ARCHITECTURE FOR A FREQUENCY DOMAIN EQUALIZER

CROSS-REFERENCES TO RELATED APPLICATIONS

The present application claims the benefit of U.S. Provisional Application No. 60/910,108, entitled "WIDE BAND NOISE EARLY DETECTION AND PROTECTION ARCHITECTURE FOR THE ROBUST FREQUENCY DOMAIN EQUALIZER," filed on Apr. 4, 2007, the entire contents of which are hereby incorporated by reference herein.

FIELD OF TECHNOLOGY

The present disclosure relates generally to communication systems, and more particularly, to when impulse noise has potentially corrupted received data.

DESCRIPTION OF THE RELATED ART

Many modern communication systems use multi-carrier modulation schemes to transmit data. Orthogonal frequency-division multiplexing (OFDM) is a digital multi-carrier modulation scheme that employs a large number of relatively closely spaced orthogonal sub-carriers or sub-channels. Each sub-carrier is modulated with a modulation scheme such as quadrature amplitude modulation, phase shift keying, etc., at a relatively low symbol rate. Even though data on a particular sub-carrier is modulated at a low symbol rate, the large number of sub-channels provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

One type of OFDM modulation, often referred to as discrete multi-tone (DMT) modulation, is utilized in some digital subscriber line (DSL) systems. In DMT modulation, modulation is adapted based on channel conditions associated with each sub-carrier. This is often accomplished by adjusting the bit rate of a sub-carrier. In particular, when a signal-to-noise ratio (SNR) for a sub-carrier is high, data may be transmitted on this sub-carrier at a higher bit rate; whereas if the SNR is low, a lower bit rate is used. Thus, in one DMT symbol, some sub-channels may carry more bits than others. This is often referred to as "bit-loading."

An advantage for these modulation schemes is that by using a narrow band for each sub-carrier (tone) the corresponding channel for each sub-carrier can be considered as constant. As a result, a Frequency Domain Equalizer (FEQ) is easy to realize "tone by tone," using just one tap of the complex multiplier per tone.

In operation, receivers normally update FEQ coefficients as the multi-carrier modulation signal is received, to minimize the error between the quantized received signal and the actually received signal. These FEQ coefficients, however, can be corrupted if impulse noise is also received. To avoid corruption, FEQ updating is typically stopped when an impulse noise is detected. In conventional systems, however, there is still FEQ coefficient corruption resulting from the impulse noise.

SUMMARY OF THE DISCLOSURE

In one embodiment, a method includes: receiving a multi-carrier modulation signal; converting the multi-carrier modulation signal to a frequency domain signal; determining a steady state frequency domain equalizer coefficient for scaling with the frequency domain signal; updating the frequency domain equalizer coefficients in a feedback loop configuration during a frequency domain equalizer updating mode; detecting an impulse noise; and in response to detecting the impulse noise, stopping the updating of the frequency domain equalizer by stopping the frequency domain equalizer updating mode, before the impulse noise corrupts the updating of the frequency domain equalizer by transmitting an impulse noise indicator signal to a processor device and coupled to control operation of the feedback configuration.

In another embodiment, an apparatus for use in a receiver includes: a fast Fourier transformer to transform a received signal to a frequency domain; a scaler to scale the transformed received signal with a frequency domain equalizer coefficient; a feedback loop to update the frequency domain equalizer based on an output from the scaler; an impulse noise detector to produce an impulse noise indicator signal in response to an impulse noise on the received signal; and a processor apparatus coupled to control operation of the feedback loop to stop updating of the frequency domain equalizer in response to the receipt of the impulse noise indicator signal.

In yet another embodiment, a method includes: receiving a multi-carrier modulation signal; converting the multi-carrier modulation signal to a frequency domain signal; in a first mode, updating frequency domain equalizer coefficients for scaling with the frequency domain signal; detecting an impulse noise; and entering a second mode stopping the updating of frequency domain equalizer coefficients before any frequency domain equalizer coefficients are corrupted by the impulse noise.

DETAILED DESCRIPTION

Embodiments of apparatus and methods for detecting impulse noise in a receiver and controlling FEQ coefficient updating are described below. Among other things, impulse noise detection and FEQ control may be useful for decoding received signals that have been encoded using an FEC code. For example, the detection of an impulse noise may be utilized to freeze FEQ coefficient updating. The embodiments described below generally relate to controlling FEQ coefficient updating at a receiver (which may be part of a transceiver device) based on detection of impulse noise.

Figure 1:
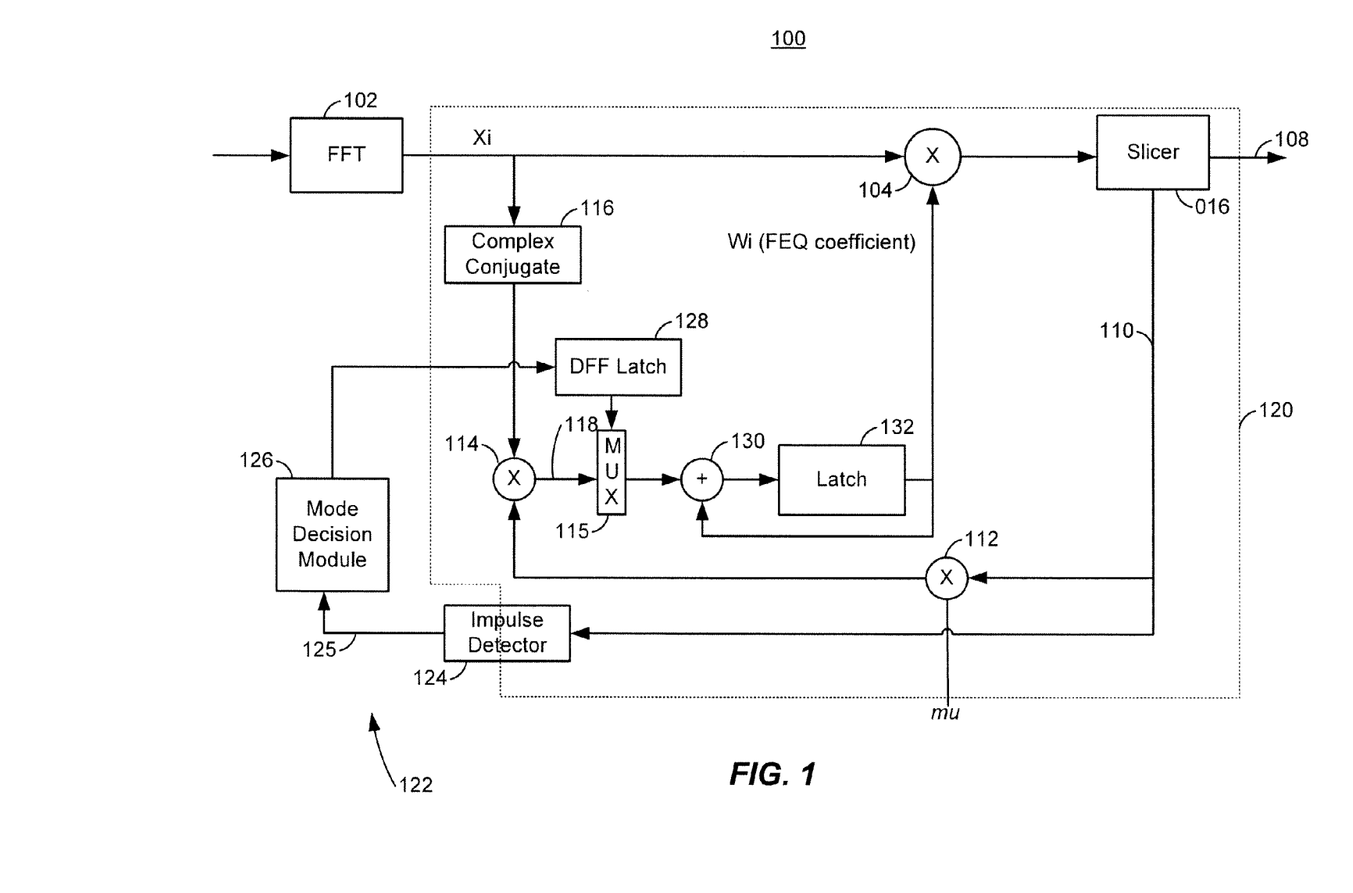
FIG. 1 is a block diagram of an example portion of a DSL receiver that utilizes impulse noise detection and FEQ update mode control in accordance with a conventional technique.

FIG. 1 shows a conventional configuration 100 for determining FEQ coefficients. A received multi-carrier modulation scheme signal is provided to a fast Fourier Transform (FFT) calculator 102 for converting the received signal from a time domain to a frequency domain. An output signal, Xi, is fetched tone by tone (e.g., $0 \leq I < 4096$ for VDSL2) and supplied to a multiplier 104 which scales and rotates the output by an FEQ coefficient, Wi, which is usually a one tap complex multiplication. The result is fed into slicer 106 which quantizes the mixed input signal, and then outputs the estimated complex data 108 and complex error signal 110. The complex error signal 110 is scaled by a scaler value mu in a multiplier (a step size scaler) 112 and multiplied in another multiplier device 114 (a loop scaler) by the complex conjugate of the signal Xi output from the complex conjugate calculator 116. The output signal 118 from the multiplier 114 is treated as the newly estimated update for this tap of the FEQ coefficient, and provided to a multiplexer 115. The scalar mu is called a step size scaler and is set by the system 100 to control the self-updating loop speed.

The system 100 would usually employ a hardware or software strategy and criterion to decide if the FEQ coefficient should be modified (self adapted) by this new updated output signal 118. That strategy and criteria determines whether the old FEQ coefficient should be replaced, e.g., by adding the new updated amount to the old FEQ coefficient, or if not, then keeping the old FEQ coefficient unchanged.

DSL applications tend to be quasi-stationary. During the initialization phase, with proper setting and training, the system 100 effectively trains the FEQ coefficient until it reaches a steady state within a reasonable amount of time. After the initialization (i.e., during normal updating mode) the FEQ coefficient can be self adapted to a slow varying additive white Gaussian noise (AWGN) channel environment, in which the only impairment is the linear addition of wideband or white noise with a constant spectral density and a Gaussian distribution of amplitude, and in which the phenomena of fading, frequency selectivity, interference, nonlinearity and dispersion are typically not accounted for.

During this normal updating mode, however, a channel may encounter a sudden burst of interference (i.e., a long impulse noise INP). When the burst interference happens, the resulting error feedback in the system 100 can be huge and severely corrupt the already stable and well trained FEQ coefficient. Further still, even after this burst interference disappears, it will take the system 100 time for the FEQ system to be re-trained and recovered to its steady state. During this corruption and recovery phase, since the FEQ coefficient is far off, the FEQ data output 108 is deemed to be bad, and the overall system performance degrades.

In contrast, a robust FEQ system needs to be able to differentiate the AWGN and impulse events, detect when impulse noise is received, and then break the feedback loop, instructing the FEQ system to freeze updates, and then decide when to resume the normal FEQ update feedback process.

Returning to FIG. 1, typically, the FEQ scaling and rotation (by Wi) function of scaler 104 and the coefficient update is computationally MIPS intensive, which causes the updating to occur in hardware 120, which may be a digital signal processor. The decision to freeze or resume updating the FEQ process is channel and profile dependent, involving low MIPS, which means that these decisions are usually a FFT symbol-by-symbol based process, typically executed in software 122. In the example of FIG. 1, impulse detection may be done either in the hardware element 120 or software 122 depending on the desired approach, and thus an impulse detector 124 is shown as being partially within the hardware element 120 and partially within the software 122.

The detector 124 may process the error data 110 from the slicer 106 for all FFT tones. If there are more than X number (e.g., 508) tones (among all 4096 tones) which have error values larger than a threshold number Y, then the detector 124 may determine that the whole DMT/OFDM symbol is under impulse attack. This detection technique, deriving a threshold based on statistics over all tones, is useful when the details about the transmitted signal are not known.

Once the detector 124 detects an impulse, an impulse detection signal 125 is supplied to an FEQ mode decision module 126, which determines whether the FEQ coefficient update mode should be frozen or resumed. Upon receipt of a logic high impulse detection signal 125, the decision module 126 instructs a D Flip-Flop (DFF) latch 128 to turn off the MUX 115 so that the updated output signal 118 is not combined in summer 130 with the current FEQ coefficient, feedback from the output of latch 132.

The system 100 has numerous shortcomings. The information transferred between the hardware 120 and software 122 (i.e., impulse detected and freeze/resume decision) takes time and needs to be synced to the DMT (FFT) symbol level. In a typical case, it will take a time equal to the sum of: (1) one DMT symbol time to detect the existence of the impulse; (2) one DMT symbol time to communicate the impulse detection from the hardware 120 to the software 122 through a direct memory access (DMA); (3) one DMT symbol time to decide to freeze the system's FEQ update mode; and (4) one DMT symbol time to communicate that decision through the DMA from the software 122 to the hardware 120. Thus, even to "immediately" freeze FEQ updating, the system 100 requires a minimum of 4 DMT symbol times.

Another problem with the system 100 is that it is difficult to set the criterion used by the module 126 to determine when to resume FEQ updating. Although the FEQ update has been frozen, corruption will have already occurred over the 4 symbol period, resulting in an incorrect FEQ coefficient and incorrect slicer output 108. This corruption will occur although the impulse has stopped; and as a result, the system 100 has no sufficient metric for resuming FEQ coefficient determination. Instead, the module 126 employs an intelligence decision based on the operators' deployment profiling and empirical data, for example, conservatively pre-setting a resume time at X number of symbols after the logic "high" on the impulse detection signal 125, where the operator has calculated X to be a period of time longer than the typical amount of time an impulse pulse lasts.

Yet another problem is that it still takes a long time after resuming the updating for the FEQ coefficient to be re-trained and recovered to the steady state after detection of an impulse pulse, especially where with the system 100, even a short impulse will corrupt the output data 108.

Figure 2:
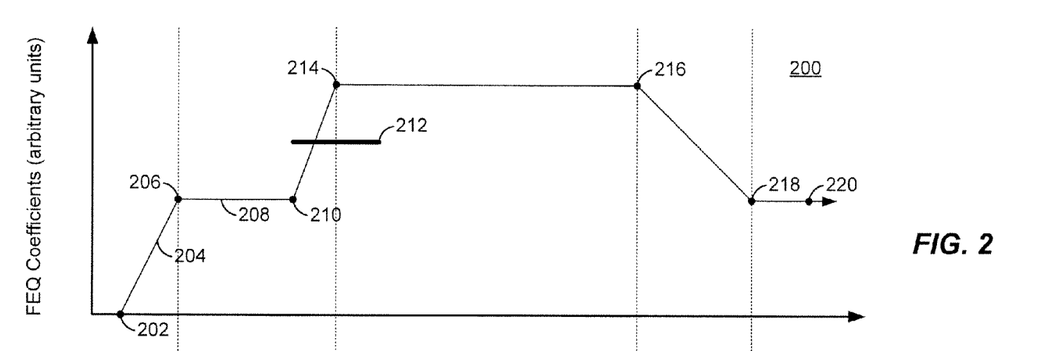
FIG. 2 is a plot of the FEQ coefficient versus time resulting from operation of the conventional technique of FIG. 1.

FIG. 2 is a plot 200 of time versus FEQ coefficient illustrating some of the conceptual problems with the approach of FIG. 1, e.g., showing that even after the impulse has stopped, the output data 108 will not be corrected until much later, in fact, a period of time over which it is difficult to determine when FEQ coefficient retraining should occur. The system 200 starts initialization at an arbitrary time 202 where, after a training period 204, the FEQ reaches steady state at a time 206. During a normal FEQ updating mode time 208, normal FEQ feedback operation is performed and the system 100 automatically tracks any minor slowly varying AWGN perturbations. At time 210, an impulse occurs lasting until time 212. As the impulse is detected, there is an increase in the FEQ coefficient until a time 214 at which point the system 100 has detected the impulse (the detector 124) and updated the FEQ process with a freeze instruction (module 126). The FEQ process stays frozen until a system configured flexible time 216, at which point, FEQ updating is resumed. The FEQ coefficient, however, is not fully retrained until a time period later, point 218, at which point the FEQ coefficient is once again at a steady state and the automatic tracking of AWGN perturbations can occur through time 220. As shown in FIG. 2, with the system 100, the output data 108 is corrupted over the entire period from time 210 to time 218, although the impulse interference signal ended much earlier at time 212.

Figure 3:
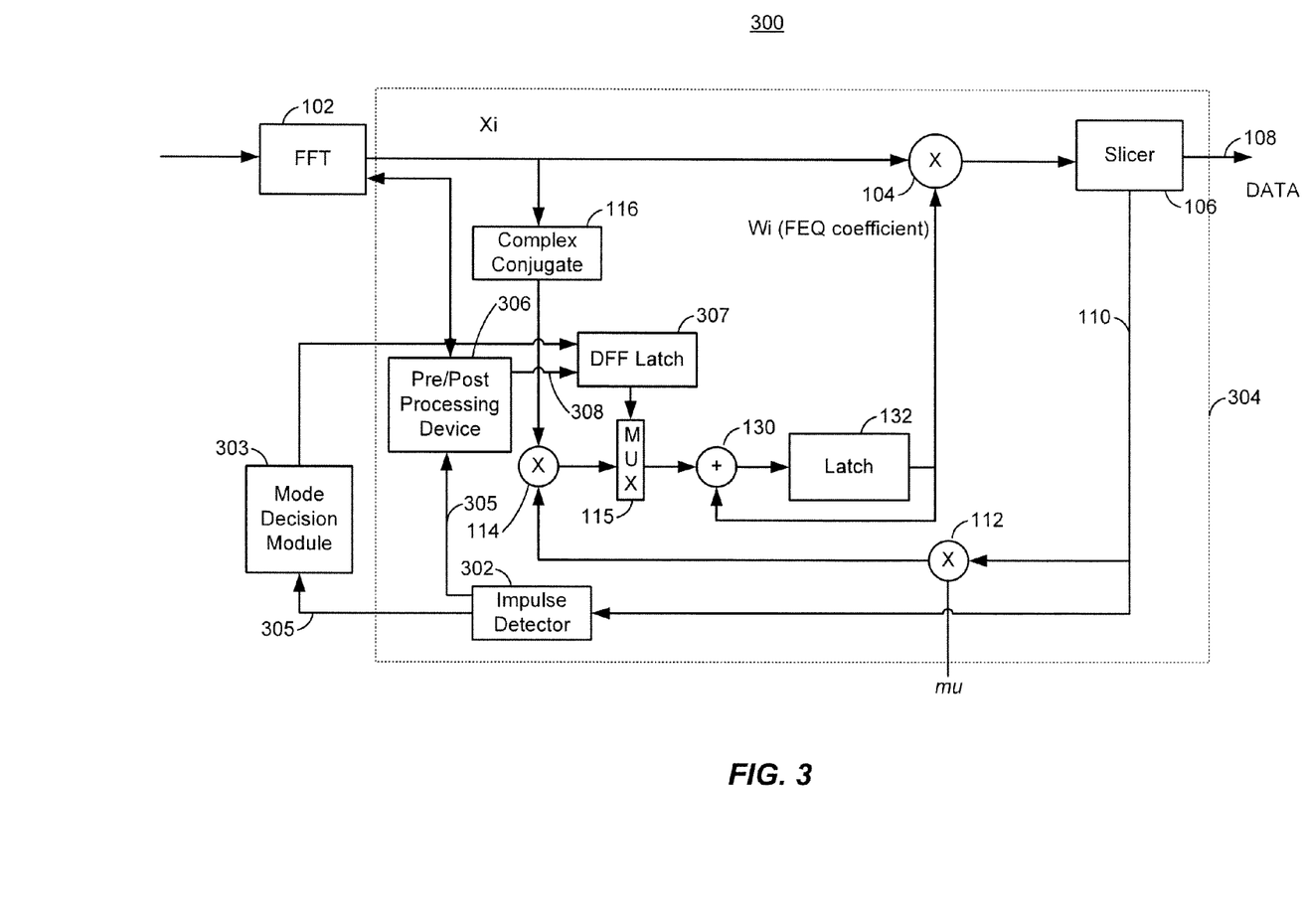
FIG. 3 is a block diagram of an example portion of a DSL receiver that utilizes impulse noise detection and FEQ update mode control in accordance with a present example.

In contrast to these conventional techniques, in accordance with an example of the present application, FIG. 3 illustrates a system 300 that may be implemented in a DSL receiver or modem to determine FEQ coefficients and more accurately freeze and resume FEQ updating in response to an interference signal like an impulse noise. For convenience purposes, where applicable, reference numerals from FIG. 1 are used to denote elements that can be the same.

Effectively, for every DMT symbol, the pre/post processor 306 partitions the regular FEQ process into two phases, a pre-processing phase and a post-processing phase. In the pre-processing phase a pre/post processor device 306 fetches a partial FFT output from FFT 102 of only those tones of pilots/monitored tones (e.g., up to 16 tones). In the post-processing phase, the device 306 cycles through all FFT tones (e.g., 4096 tones) from slicer 106. In the pre-processing phase, the error feedback is turned off, e.g., with a logic 0 supplied to a MUX 115.

In the illustrated example, an impulse detection device 302 has been formed entirely with an hardware 304, and a decision module 303 controls latching of a DFF latch 307 to resume FEQ updating in response to the output from the impulse detection device 302 and sometimes other system considerations such as certain specific impulse filtering and deployment profiling criteria. Unlike the system 100, the system 300 includes a second output from the impulse detection device 302 that provides an identical impulse detection signal 305 to the pre/post processor device 306 that controls FEQ freeze. The processor device 306 supplies, as a second input, a FEQ freeze signal to the DFF latch 307, as well as a control signal to the FFT 102 for directing the FFT 102 to provide a finite set of pre-determined tones during the pre-processing phase in response to the impulse detection or to provide the whole set of tones during the post-processing phase for the FEQ error tracking and update process. The DFF latch 307 controls, based on the freeze command from 306 and the resume command from 303, operation of the MUX 115 to determine whether, in the post-processing phase, to supply the updated FEQ error estimation signal to the summer 130 and the latch 132, in accordance with the configurations discussed above for FIG. 1.

The system 300 processes impulse detection in hardware (via block 302) to decide if an impulse has occurred in the pre-processing phase. In this case, the pre/post processor device 306 immediately freezes the DFF latch 307 (and thus the FEQ update mode) in the post-processing phase until, some DMT symbols later, a new resume command to release the freeze is received from the decision module 303, which will, depending on its own criteria, issue a resume command to the DFF latch 307 to continue the regular FEQ error tracking and update. The decision module 303 may be like that of module 126 or it may apply a different set of criteria to determine when to resume on FEQ coefficient updating. In some examples, the decision module 303 may determine when the impulse noise has stopped based on a conservative filtering results of "no impulse" signal from the detector 302 and then send a resume FEQ updating mode signal to DFF latch 307.

In the example of FIG. 3, the DFF latch 307 may be a simple Set/Reset Flip Flop (RSFF), that is set to a freeze state immediately, through the hardware freeze command on line 308 from the pre/post processor device 306. The RSFF 307 may be reset through a software resume command from the decision module 303. In this way, the RSFF 307 is synchronized with the post-processing phase of the module 306 to control whether the error feedback signal 118 should be turned on or not.

The system 300 may be implemented with lower hardware cost, as the hardware configuration is similar to that of conventional system of FIG. 1, with the exception of the addition of the pre/post processing module 306. The impact on cycle times may be minimized, e.g., to a worst case scenario of $16/4096 \sim 0.3\%$. The freezing of FEQ updating may be achieved completely within the hardware 304, meaning there is no need for a hardware/software interface or DMA. Furthermore, the FEQ update mode may be turned off immediately upon impulse detection, thereby preventing the error feedback from corrupting the FEQ coefficients, which may ensure that robust and reliable impulse detection information will be fed into the decision module 303, allowing that module 303 to more accurately determine if the impulse still exists and set appropriate criterion for deciding when to resume FEQ coefficient update.

Any substantial corruption of the FEQ output would be during the period of the impulse pulse, and not over an entire cycle of time periods as with the system 100. Furthermore, the downstream process (e.g., an interleaver and ECC, not shown) will have a better chance of combating and recovering from the impulse during the actual pulse duration.

Figure 4:
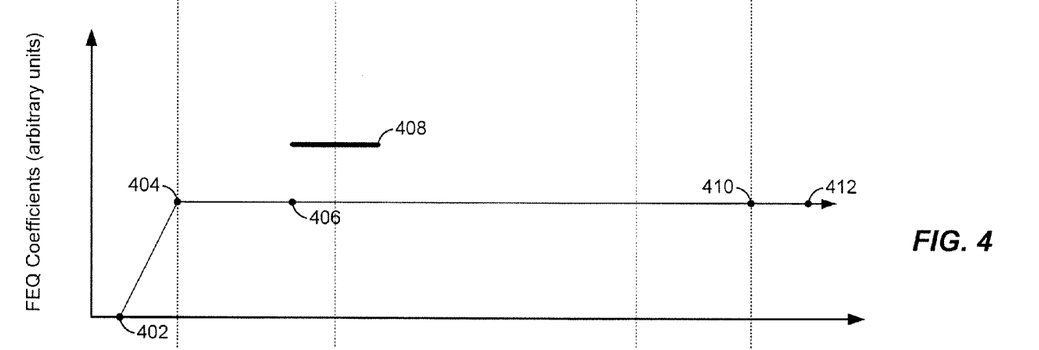
FIG. 4 is a plot of the FEQ coefficient versus time resulting from operation of the technique of FIG. 3.

FIG. 4 is a plot 400 of FEQ coefficient versus time for an example operation of the system 300. Initialization starts at a time 402 and continues during a training period to a time 404 where the FEQ reaches a steady state, and the system 200 enters a normal updating mode, during which the FEQ error feedback is turned on and automatic tracking of minor AWGN perturbations occurs. An impulse occurs at a time 406 (corresponding to time 210), at which time an impulse detection signal is sent from the detector 302 to the device 306 within hardware, at which point the FEQ freeze signal 308 is transmitted to DFF latch 307. During the impulse pulse duration (from time 406 to time 408), the FEQ coefficient is not corrupted, as can be seen by the lack of a rise in the FEQ coefficient value. Therefore, the impulse detector 302 is able to feed correct impulse information to the decision module 303 for proper analysis of the impulse pulse. The times corresponding to times 214 and 216 from FIG. 2 are shown for convenience, but it is noted that such events associated with the corrupted FEQ coefficients are no longer an issue with the system 300. Further still, the impulse detector 302 senses the end of the impulse pulse at time 408 and supplies a "no impulse" signal to the decision module 303, which then determines (e.g., after a period of comfortable monitoring) when to resume the FEQ coefficient update. In the instant example, such updating may occur at time 410, corresponding to time 218, although the updating may occur at a sooner point in time (prior to time 410), depending on the decisional logic applied by the module 303. During the period of time between times 406 and 410, all the FEQ error feedback is turned off and the FEQ coefficients kept the same as they were when determined at time 406. Between the time 410 and time 412, FEQ error feedback is turned back on and automatic tracking of minor AWGN perturbations resumes, leaving the final FEQ coefficient. The final FEQ coefficient at time 412 should then approach that of the time at 406, with only very minor AWGN perturbation due to quasi-stationary slow-varying channel characteristics.

Figure 5:
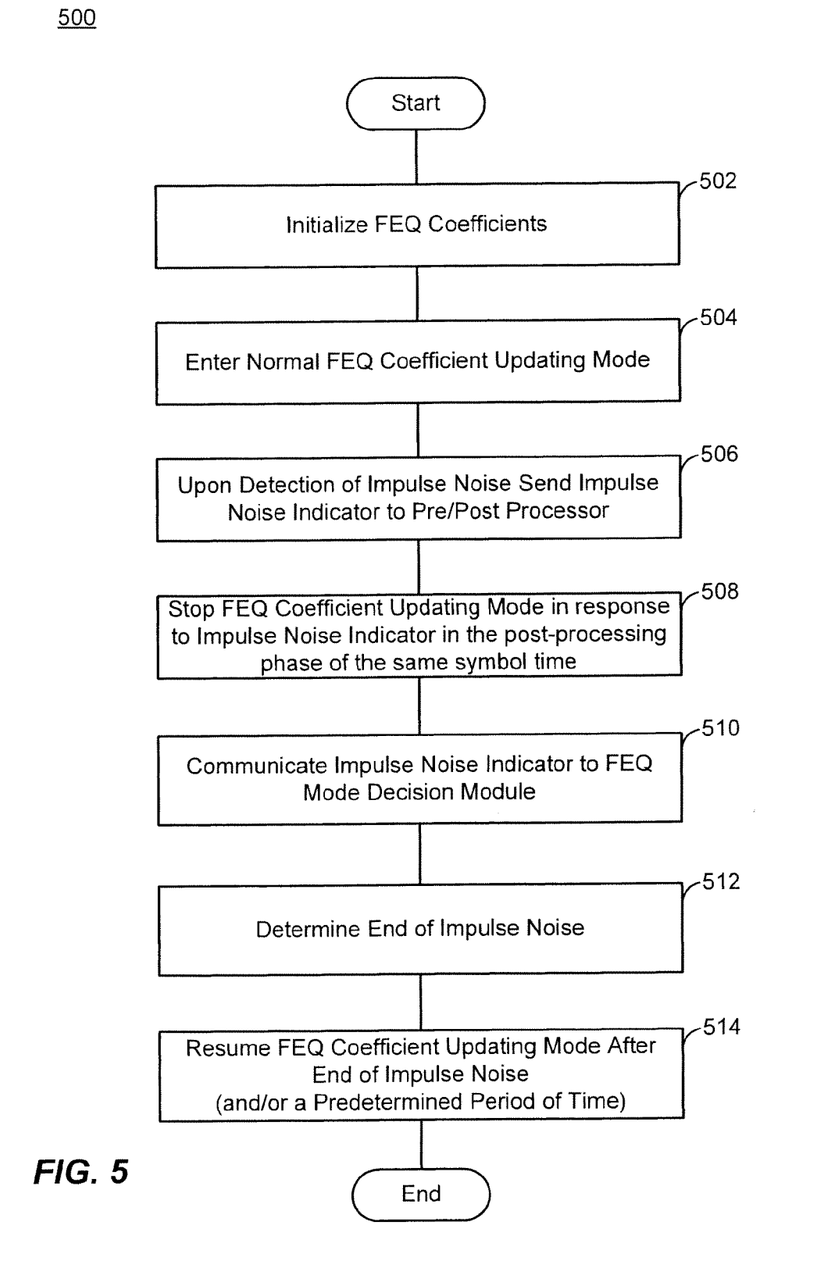
FIG. 5 is a flow diagram of an example method for controlling FEQ update mode during an impulse detection.

FIG. 5 is a flow diagram of an example method 500 for detecting the start of an impulse signal and freezing FEQ coefficient updating in response thereto, as well as for resuming FEQ coefficient updating at a later point. The method may be implemented by the system 300, although this is discussed merely by way of example, as the method may be implemented by other suitable apparatus, whether by software or hardware or, as discussed by an example of the two.

At a first block 502 the method 500 initializes the FEQ coefficients. The method 500 then enters a normal FEQ coefficient updating mode at a second block 504, until it is determined that impulse noise signal has been received, at which time a block 506 sends an impulse noise indicator signal to the pre/post processor device 306 for freezing (or stopping) the updating mode. At block 508, the method 500 stops the FEQ coefficient updating mode immediately, i.e., in the post-processing phase of the same symbol time for the received multi-carrier signal. Separate from this freezing operation, a block 510 sends the impulse noise indicator to an FEQ mode decision module, e.g., the module 303, for determining when to resume the FEQ updating mode. Because such resumption is to occur after the end of the impulse noise, in the illustrated example, a block 512 determines when the end of impulse noise has occurred. While, a block 514 of the method 500 instructs to resume FEQ coefficient updating, which may occur solely in response to receipt of a filtered results of the no impulse signal, after a system configured or otherwise defined period of time, a combination or both, or based on another decisional criteria.

Figure 6:
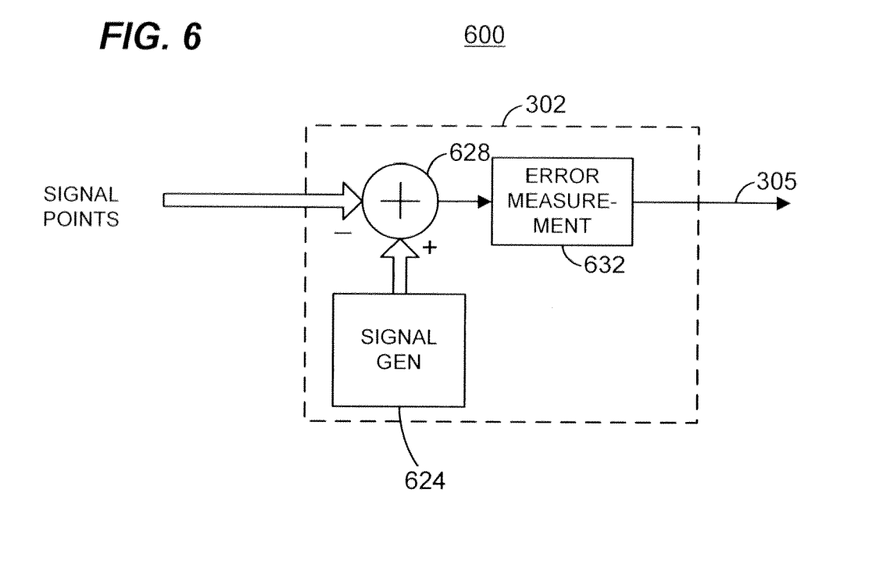
FIG. 6 is a block diagram of an example portion of a receiver that utilizes impulse noise detection to produce an FEQ update mode control signal.

FIG. 6 is a block diagram of an example implementation of the impulse detector 302. This particular example is similar to that discussed in U.S. application Ser. No. 12/044,762, filed Mar. 7, 2008, entitled "METHOD AND APPARATUS FOR DETECTING IMPULSE NOISE," which is hereby incorporated herein by reference in its entirety. Generally, speaking the module 302 may monitor for a pre-determined number (X) of pilots/monitored tons. The FEQ output resulting from these tones may then be compared with the a priori (known) transmitted signals, after which a threshold Y is set to determine whether these pilots are corrupted or not. If more than Z numbers of tones are corrupted, then the module 303 may determine that the impulse has attacked the entire DMT. With this technique, because the a priori is known, the threshold is more easily set. In this technique, once the impulse attack has been identified, the device 306 freezes the FEQ updates by signaling on the line 308, and the system will wait until certain conditions are fulfilled before FEQ updating is resumed through a resume signal from the decision module 303.

As discussed in the incorporated application, any suitable decision module that may be utilized in communication systems, using DMT or other types of OFDM modulation, may be used in the system 300. For example, impulse noise detection techniques may be used to detect erasures in an OFDM symbol. More generally, information known a priori to a receiver may be used to detect the impulse in formatted data units other than OFDM symbols, such as packets, frames, etc. Moreover, if it has been determined that impulse noise (impulse) has affected a data unit (which may be something other than an OFDM symbol such as a packet, frame, etc.), it may be determined that other data in the data unit should be considered erasures. For example, the formatted data unit may include signals corresponding to a physical layer of a communication protocol, and the information known a priori to the receiver may be associated with these signals. Additionally, the formatted data unit may include payload data that corresponds to layers above the physical layer. In such an embodiment, it may be determined whether payload data should be considered erasures based on whether it is determined that impulse noise affected physical layer signals.

FIG. 6 is a block diagram of an example decoding system 600 that may be implanted implemented by the detector 302 for use in a receiver or in a receiver portion of a transceiver. The decoding system 600 illustrates that impulse detection and erasure detection techniques that utilize information known a priori to a receiver can be used in a variety of contexts, which may include, but are not limited to, DMT modulation and/or DSL systems. For example, a decoding system such as the decoding system 600 may be utilized in wireless communication systems, digital broadcast systems, cable television systems, etc.

The decoding system 600 may receive signal point data that is at least partially demodulated, such as error data 110 from the scaler 106. For example, if QAM modulation is utilized, the signal point data may be I and Q coordinate pairs. If other modulation techniques are utilized, the received data may be indicative a frequency information (e.g., for frequency-shift keying modulation), phase information (e.g., for phase-shift keying modulation), amplitude information (e.g., for amplitude-shift keying modulation), etc. This signal point data may correspond to initial received data to the FFT 102 in formatted data units such as OFDM symbols, DMT symbols, packets, etc.

Generally, the impulse noise detector 302 attempts to detect impulse noise in a received data unit. Additionally, the impulse noise detector 302 generates an indicator to indicate when impulse noise is detected in the data unit. The impulse noise detector 302 includes a signal generator 624 that generates signals corresponding to information known a a priori by the receiver. For example, in an OFDM system in which sub-channels are modulated using QAM, the signal generator 624 may generate QAM signals or I/Q coordinate pairs corresponding to pilot tones or other deterministic signals in the OFDM symbol. A deterministic signal may be, for example, a signal that corresponds to a fixed sequence known by the receiver, a signal that corresponds to a pseudo-random sequence that the receiver can generate, etc. For example, the signal generator 624 may include a PRBS generator the same as or similar to a PRBS generator at the transmitter. The PRBS generator of the signal generator 624 may permit the signal generator 624 to recreate the PRBS used by the transmitter to generate signals in the data unit.

More generally, the signal generator 624 may generate data that corresponds to the particular type of modulation employed. For example, the signal generator 624 may generate frequency data, phase data, amplitude data, etc. The signals generated by the signal generator 624 may correspond to un-mapped data that would have been received by a mapping device (not shown) if there are no errors.

The impulse noise detector 302 may include a subtraction device 628 coupled to the signal generator 624. The subtraction device 628 generates an error signal that indicates the actual errors in received signals that are known a priori by the receiver.

The impulse noise detector 302 also may include an error measurement device 632. The error measurement device 632 generally may measure a level of errors corresponding to a data unit detected by the subtraction device 628. For example, the error measurement device 632 may generate an accumulation of errors corresponding to a data unit. The error measurement device 632 also may determine when the level of errors indicates impulse noise and may generate the indicator of impulse noise signal 305. The impulse noise detector 302 may include a controller (not shown), that is utilized for configuration and/or control thereof.

The apparatus and methods described above may be utilized in a variety of devices such as wireless communication devices, consumer electronics devices, modems, etc. As a specific example, apparatus and methods such as described above may be utilized in DSL modems.

Figure 7A:
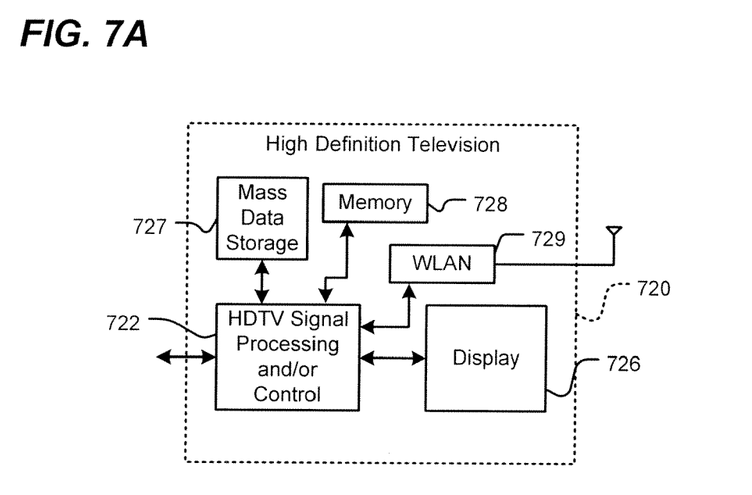
FIG. 7A is a block diagram of a high definition television that may utilize impulse noise detection and FEQ control techniques such as described herein.

Referring now to FIGS. 7A-7F, various example devices will be described that may utilize impulse noise detection and FEQ updating mode control techniques such as described above. Referring to FIG. 7A, such techniques may be utilized in a high definition television (HDTV) 720. The HDTV 720 includes signal processing and/or control circuits, which are generally identified in FIG. 7A at 722, a WLAN network interface 729, and a mass data storage 727. Impulse noise detection and FEQ updating mode control techniques may be utilized in the WLAN network interface 729 or the signal processing circuit and/or control circuit 722, for example. HDTV 720 receives HDTV input signals in either a wired or a wireless format and generates HDTV output signals for a display 726. In some implementations, signal processing circuit and/or control circuit 722 and/or other circuits (not shown) of HDTV 720 may process data, perform coding and/or encryption, perform calculations, format data and/or perform any other type of HDTV processing that may be required.

HDTV 720 may communicate with mass data storage 727 that stores data in a nonvolatile manner such as optical and/or magnetic storage devices. The mass data storage 727 may include one or more hard disk drives (HDDs) and/or one or more digital versatile disks (DVDs). One or more of the HDDs may be a mini HDD that includes one or more platters having a diameter that is smaller than approximately 1.8". HDTV 720 may be connected to memory 728 such as RAM, ROM, low latency nonvolatile memory such as flash memory and/or other suitable electronic data storage. HDTV 720 also may support connections with a WLAN via the WLAN network interface 729.

Figure 7B:
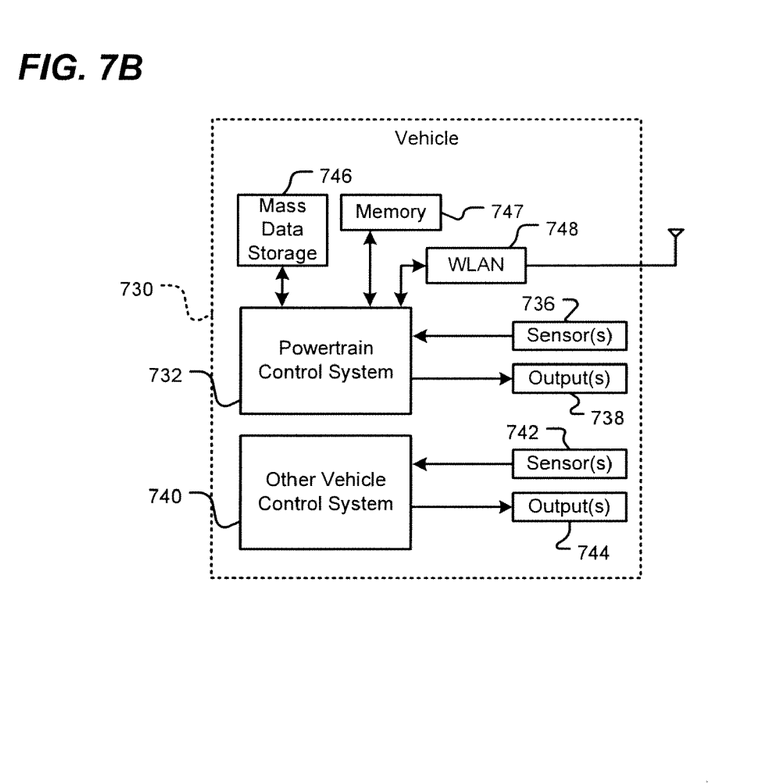
FIG. 7B is a block diagram of a vehicle that may utilize impulse noise detection and FEQ control techniques such as described herein.

Referring now to FIG. 7B, impulse noise detection and FEQ updating mode control techniques such as described above may be utilized in a control system of a vehicle 730. In some implementations, a powertrain control system 732 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 740 may likewise receive signals from input sensors 642 and/or output control signals to one or more output devices 744. In some implementations, control system 740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 732 may communicate with mass data storage 746 that stores data in a nonvolatile manner. Mass data storage 746 may include optical and/or magnetic storage devices for example hard disk drives (HDDs) and/or DVDs. One or more of the HDDs may be a mini HDD that includes one or more platters having a diameter that is smaller than approximately 1.8". Powertrain control system 732 may be connected to memory 747 such as RAM, ROM, low latency nonvolatile memory such as flash memory and/or other suitable electronic data storage. Powertrain control system 732 also may support connections with a WLAN via a WLAN network interface 748. Impulse noise detection and FEQ updating mode control techniques such as described above may be implemented in the WLAN network interface 748. The control system 740 may also include mass data storage, memory and/or a WLAN interface (all not shown).

Figure 7C:
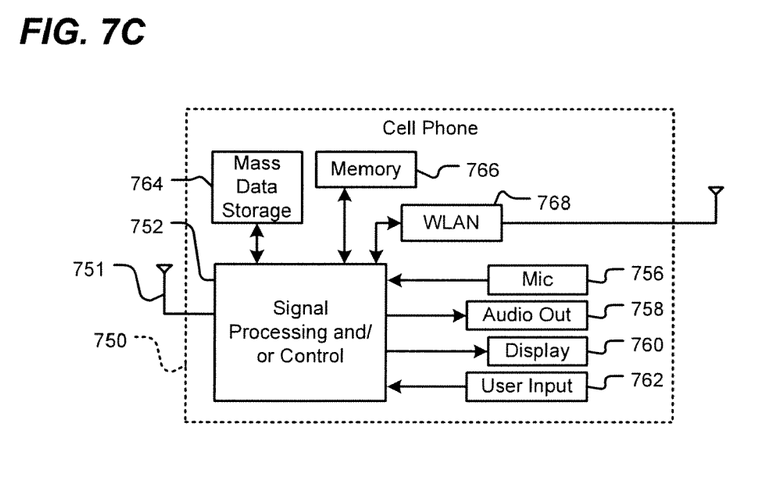
FIG. 7C is a block diagram of a cellular phone that may utilize impulse noise detection and FEQ control techniques such as described herein.

Referring now to FIG. 7C, techniques such as described above may also be utilized in a cellular phone 750 that may include a cellular antenna 751. The cellular phone 750 includes signal processing and/or control circuits, which are generally identified in FIG. 7C at 752, a WLAN network interface 768, and a mass data storage 764. Impulse noise detection and FEQ updating mode control techniques may be implemented in the signal processing and/or control circuits 752 and/or the WLAN network interface 768, for example. In some implementations, cellular phone 750 includes a microphone 756, an audio output 758 such as a speaker and/or audio output jack, a display 760 and/or an input device 762 such as a keypad, pointing device, voice actuation and/or other input device. Signal processing and/or control circuits 752 and/or other circuits (not shown) in cellular phone 750 may process data, perform coding and/or encryption, perform calculations, format data and/or perform other cellular phone functions.

Cellular phone 750 may communicate with mass data storage 764 that stores data in a nonvolatile manner such as optical and/or magnetic storage devices for example hard disk drives (HDDs) and/or DVDs. At least one HDD may be a mini HDD that includes one or more platters having a diameter that is smaller than approximately 1.8". Cellular phone 750 may be connected to memory 766 such as RAM, ROM, low latency nonvolatile memory such as flash memory and/or other suitable electronic data storage. Cellular phone 750 also may support connections with a WLAN via the WLAN network interface 768.

Figure 7D:
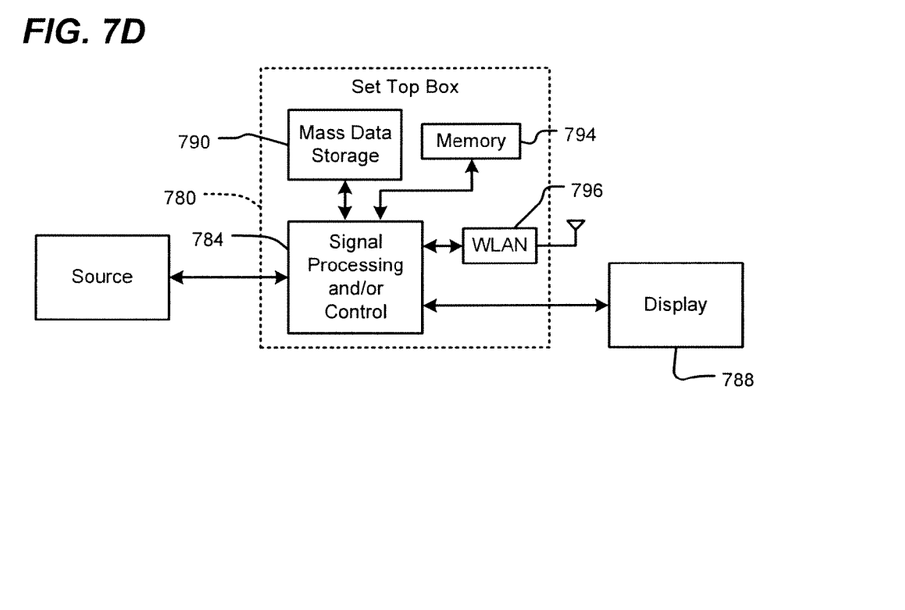
FIG. 7D is a block diagram of a set top box that may utilize impulse noise detection and FEQ control techniques such as described herein.

Referring now to FIG. 7D, techniques such as described above may be utilized in a set top box 780. The set top box 780 includes signal processing and/or control circuits, which are generally identified in FIG. 7D at 784, a WLAN network interface 796, and a mass data storage device 790. Impulse noise detection and FEQ updating mode control techniques may be implemented in the signal processing and/or control circuits 784 and/or the WLAN network interface 796, for example. Set top box 780 receives signals from a source such as a broadband source and outputs standard and/or high definition audio/video signals suitable for a display 788 such as a television and/or monitor and/or other video and/or audio output devices. Signal processing and/or control circuits 784 and/or other circuits (not shown) of the set top box 780 may process data, perform coding and/or encryption, perform calculations, format data and/or perform any other set top box function.

Set top box 780 may communicate with mass data storage 790 that stores data in a nonvolatile manner. Mass data storage 790 may include optical and/or magnetic storage devices for example hard disk drives (HDDs) and/or DVDs. At least one HDD may be a mini HDD that includes one or more platters having a diameter that is smaller than approximately 1.8". Set top box 780 may be connected to memory 794 such as RAM, ROM, low latency nonvolatile memory such as flash memory and/or other suitable electronic data storage. Set top box 780 also may support connections with a WLAN via the WLAN network interface 796.

Figure 7E:
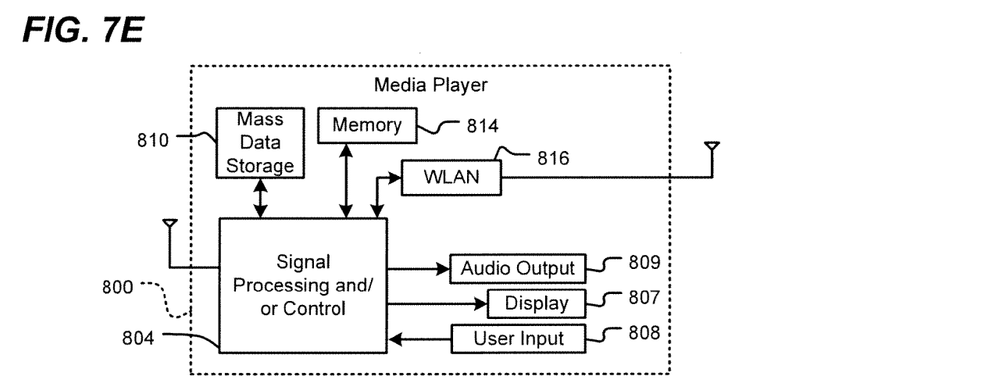
FIG. 7E is a block diagram of a media player that may utilize impulse noise detection and FEQ control techniques such as described herein.

Referring now to FIG. 7E, techniques such as described above may be utilized in a media player 800. The media player 800 may include signal processing and/or control circuits, which are generally identified in FIG. 7E at 804, a WLAN network interface 816, and a mass data storage device 810. Impulse noise detection and FEQ updating mode control techniques may be implemented in the signal processing and/or control circuits 804 and/or the WLAN network interface 816, for example. In some implementations, media player 800 includes a display 807 and/or a user input device 808 such as a keypad, touchpad and the like. In some implementations, media player 800 may employ a graphical user interface (GUI) that typically employs menus, drop down menus, icons and/or a point-and-click interface via display 807 and/or user input device 808. Media player 800 further includes an audio output 809 such as a speaker and/or audio output jack. Signal processing and/or control circuits 804 and/or other circuits (not shown) of media player 800 may process data, perform coding and/or encryption, perform calculations, format data and/or perforin any other media player function.

Media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives (HDDs) and/or DVDs. At least one HDD may be a mini HDD that includes one or more platters having a diameter that is smaller than approximately 1.8". Media player 800 may be connected to memory 814 such as RAM, ROM, low latency nonvolatile memory such as flash memory and/or other suitable electronic data storage. Media player 800 also may support connections with a WLAN via the WLAN network interface 816. Still other implementations in addition to those described above are contemplated.

FIG. 7E illustrates an antenna coupled to the signal processing and/or control circuits 804. The antenna may be a loop antenna, a whip antenna, headphone wires, a metal pad, a metal pad mounted on a device that so that, when worn, the metal pad will be in contact with a person's skin, etc.

Figure 7F:
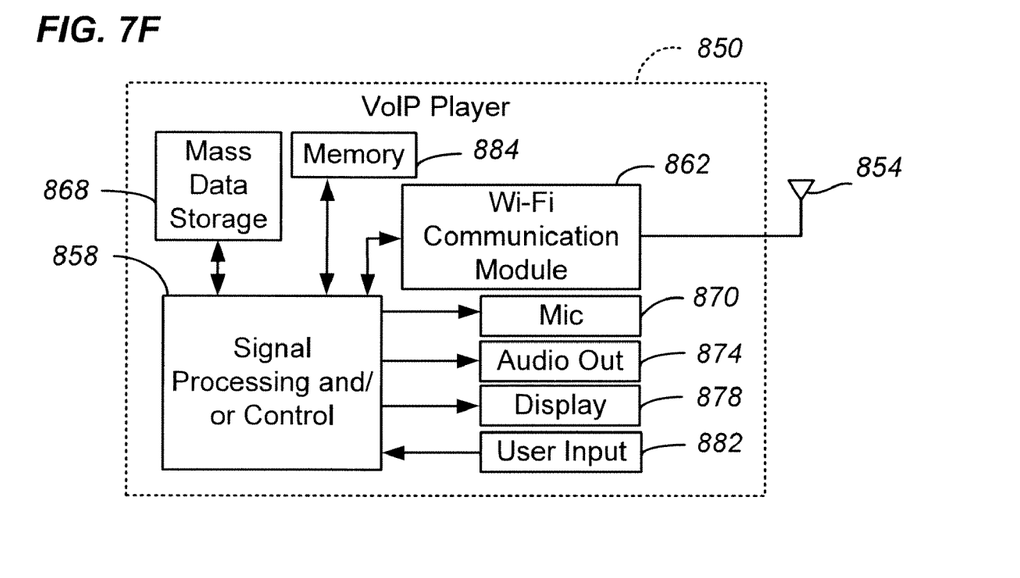
FIG. 7F is a block diagram of a voice over IP device that may utilize impulse noise detection and FEQ control techniques such as described herein.

Referring to FIG. 7F, techniques such as described above may be utilized in a Voice over Internet Protocol (VoIP) phone 850 that may include an antenna 854, signal processing and/or control circuits 858, a wireless interface 862, and a mass data storage 868. Impulse noise detection and FEQ updating mode control techniques such as described above may be implemented in the signal processing and/or control circuits 858 and/or the wireless interface 862, for example. In some implementations, VoIP phone 850 includes, in part, a microphone 870, an audio output 874 such as a speaker and/or audio output jack, a display monitor 878, an input device 882 such as a keypad, pointing device, voice actuation and/or other input devices, and a Wireless Fidelity (Wi-Fi) communication module 862. Signal processing and/or control circuits 858 and/or other circuits (not shown) in VoIP phone 850 may process data, perform coding and/or encryption, perform calculations, format data and/or perform other VoIP phone functions.

VoIP phone 850 may communicate with mass data storage 868 that stores data in a nonvolatile manner such as optical and/or magnetic storage devices, for example hard disk drives (HDDs) and/or DVDs. The HDD may be a mini HDD that includes one or more platters having a diameter that is smaller than approximately 1.8". VoIP phone 850 may be connected to memory 884, which may be a RAM, ROM, low latency nonvolatile memory such as flash memory and/or other suitable electronic data storage. VoIP phone 850 is configured to establish communications link with a VoIP network (not shown) via Wi-Fi communication module 862.

Although in the examples above, certain blocks were described as being implemented in hardware, software, or firmware, it will be understood that more generally any of the various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). The software may be machine readable instructions that are capable of causing one or more processors to perform various acts. When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
   converting a multi-carrier modulation signal to a frequency domain signal;

determining steady state frequency domain equalizer coefficients for scaling with the frequency domain signal;

updating the frequency domain equalizer coefficients in a feedback loop configuration during a frequency domain equalizer updating mode;

detecting an impulse noise;

in response to detecting the impulse noise, stopping the updating of the frequency domain equalizer coefficients by stopping the frequency domain equalizer updating mode; and before the impulse noise corrupts the updating of the frequency domain equalizer coefficients, transmitting an impulse noise indicator signal to a processor device coupled to control operation of the feedback loop.

2. A method according to claim 1, further comprising:

resuming the updating of the frequency domain equalizer coefficients after the impulse noise has stopped using a decisional criterion.

3. A method according to claim 2, wherein the multi-carrier modulation signal comprises a plurality of tones, the method further comprising:

determining error values for each of the plurality of tones;

determining a number of tones having error values larger than a first threshold value; and producing the impulse noise indicator signal when the number of tones having error values larger than the threshold value is larger than a second threshold value derived from the error values for each of the plurality of tones.

4. A method according to claim 2, wherein the multi-carrier modulation signal comprises a plurality of tones, the method further comprising:

determining error values for each of the plurality of tones;

comparing the error values for each of the plurality of tones to information known a priori to produce an error signal;

measuring the produced error signal to determine an error between the plurality of tones and the a priori information; and generating the impulse noise indicator signal based on the determination of the error.

5. A method according to claim 4, further comprising determining the a priori information during a frequency domain equalizer initialization phase in which the frequency domain equalizer coefficient approaches a steady state value.

6. A method according to claim 1, further comprising during a frequency domain equalizer initialization phase, receiving a frequency domain equalizer control signal at a first logical state from the processor device to allow frequency domain equalizer updating through the feedback loop configuration; and in response to detection of the impulse noise, receiving the frequency domain equalizer control signal at a second logical state from the processor device to prevent frequency domain equalizer updating through the feedback loop configuration, wherein the first logical state is different from the second logical state.

7. A method according to claim 1, wherein the multi-carrier modulation signal contains an orthogonal frequency-division multiplexing (OFDM) symbol, further comprising stopping the frequency domain equalizer updating mode in less than one OFDM symbol time.

8. A method according to claim 1, wherein the multi-carrier modulation signal contains a discrete multi-tone (DMT) symbol, further comprising stopping the frequency domain equalizer updating mode in less than one DMT symbol time.

9. An apparatus for use in a receiver, the apparatus comprising:

a fast Fourier transformer to transform a received signal to a frequency domain;

a scaler to scale the transformed received signal with a frequency domain equalizer coefficient;

a feedback loop to update the frequency domain equalizer coefficient based on an output from the scaler;

an impulse noise detector to produce an impulse noise indicator signal in response to an impulse noise on the received signal; and a processor apparatus to control operation of the feedback loop to stop updating of the frequency domain equalizer coefficient in response to the receipt of the impulse noise indicator signal; and a slicer to receive the output from the scaler and produce a data signal and an error signal, the slicer to provide the error signal to the impulse noise detector.

10. An apparatus according to claim 9, further comprising a decision module to receive the impulse noise indicator signal from the impulse noise detector and to control operation of the feedback loop to resume updating of the frequency domain equalizer.

11. An apparatus according to claim 10, wherein the decision module is separate from the processor apparatus.

12. An apparatus according to claim 10, further comprising a step size scaler to receive the error signal from the slicer and scale the error signal with a self-updating loop speed indicator; and a loop scaler to scale a scaled output signal from the step size scaler with a complex conjugate of the transformed received signal.

13. The apparatus according to claim 12, further comprising:

a multiplexer to receive an output signal from the loop scaler and provide the output signal to a summer for combining with an existing frequency domain equalizer coefficient to produce an updated frequency domain equalizer coefficient during a frequency domain equalizer updating mode; and a latch to control the multiplexer between the frequency domain equalizer updating mode and a stopped frequency domain equalizer updating mode.

14. An apparatus according to claim 13, wherein the processor apparatus and the decision module are coupled to the latch to control updating of the frequency domain equalizer coefficient.

15. An apparatus according to claim 9, wherein the impulse noise detector includes:

a signal generator to generate actual transmitted signal points based on information known a priori by the receiver; and an error measurement device to generate an impulse noise indicator signal based on errors between actual transmitted signal points generated by the signal generator and received signal points.

16. An apparatus according to claim 9, wherein the received signal contains an orthogonal frequency-division multiplexing (OFDM) symbol, wherein the processor apparatus is coupled to the impulse noise detector and feedback loop to stop the frequency domain equalizer updating mode in less than one OFDM symbol time.

17. An apparatus according to claim 9, wherein the received signal contains a discrete multi-tone (DMT) symbol, wherein the processor apparatus is coupled to the impulse noise detector and feedback loop to stop the frequency domain equalizer updating mode in less than one DMT symbol time.

18. A method, comprising:
converting a multi-carrier modulation signal to a frequency domain signal;
in a first mode, updating frequency domain equalizer coefficients for scaling with the frequency domain signal;
detecting an impulse noise from an error signal produced by slicing an output that results from applying the frequency domain equalizer coefficients to the frequency domain signal, where the slicing produces the error signal and a data signal; and
in a second mode, stopping the updating of frequency domain equalizer coefficients before any frequency domain equalizer coefficients are corrupted by the impulse noise.

19. A method according to claim 18, further comprising resuming the first mode after a defined period of time.

20. A method according to claim 18, further comprising:
determining when the impulse noise has stopped; and
resuming the first mode after the impulse noise has stopped.

21. A method according to claim 18, wherein the multi-carrier modulation signal contains an orthogonal frequency-division multiplexing (OFDM) symbol, further comprising stopping the first mode in less than one OFDM symbol time.

22. A method according to claim 18, wherein the multi-carrier modulation signal contains a discrete multi-tone (DMT) symbol, further comprising stopping the first mode in less than one DMT symbol time.

* * * * *